United States Patent
Sievenpiper

[15] 3,655,204
[45] Apr. 11, 1972

[54] ROD WIPER

[72] Inventor: Ward Sievenpiper, Milgrove, N.Y.

[73] Assignee: A-T-O Inc., Cleveland, Ohio

[22] Filed: Feb. 3, 1970

[21] Appl. No.: 8,175

[52] U.S. Cl. ............................................. 277/24, 277/205
[51] Int. Cl. ......................................... F16j 15/16, F16j 9/08
[58] Field of Search ...................... 277/24, 205, 206, 35, 170,
277/179; 115/210 B

[56] References Cited

UNITED STATES PATENTS

| | | | |
|---|---|---|---|
| 2,776,173 | 1/1957 | Rudy | 277/24 UX |
| 2,907,596 | 10/1959 | Mahu | 277/205 |
| 3,167,323 | 1/1965 | Appleton et al. | 277/205 |

FOREIGN PATENTS OR APPLICATIONS

| | | | |
|---|---|---|---|
| 876,312 | 8/1961 | Great Britain | 277/24 |
| 867,336 | 2/1953 | Germany | 277/170 |

Primary Examiner—Samuel B. Rothberg
Attorney—Christel & Bean

[57] ABSTRACT

A wiper adapted to fit within a cavity of a first member, such as the housing of an hydraulic cylinder, and wipe against a second relatively reciprocable member, such as the rod of an hydraulic cylinder. The wiper comprises an annular body of synthetic plastic material, preferably urethane, having a generally planar axial end face and formed at the opposite axial end face into a first annular flange of generally frusto-conical outline extending generally axially therefrom and terminating in a sharp winding edge at the inner surface thereof. The body also is formed at the same end face into a second, axially extending annular flange spaced radially outwardly from the first flange to define an annular groove therebetween and having an annular shoulder on the outer surface thereof adapted to abut an annular retaining lip formed in the cavity.

12 Claims, 5 Drawing Figures

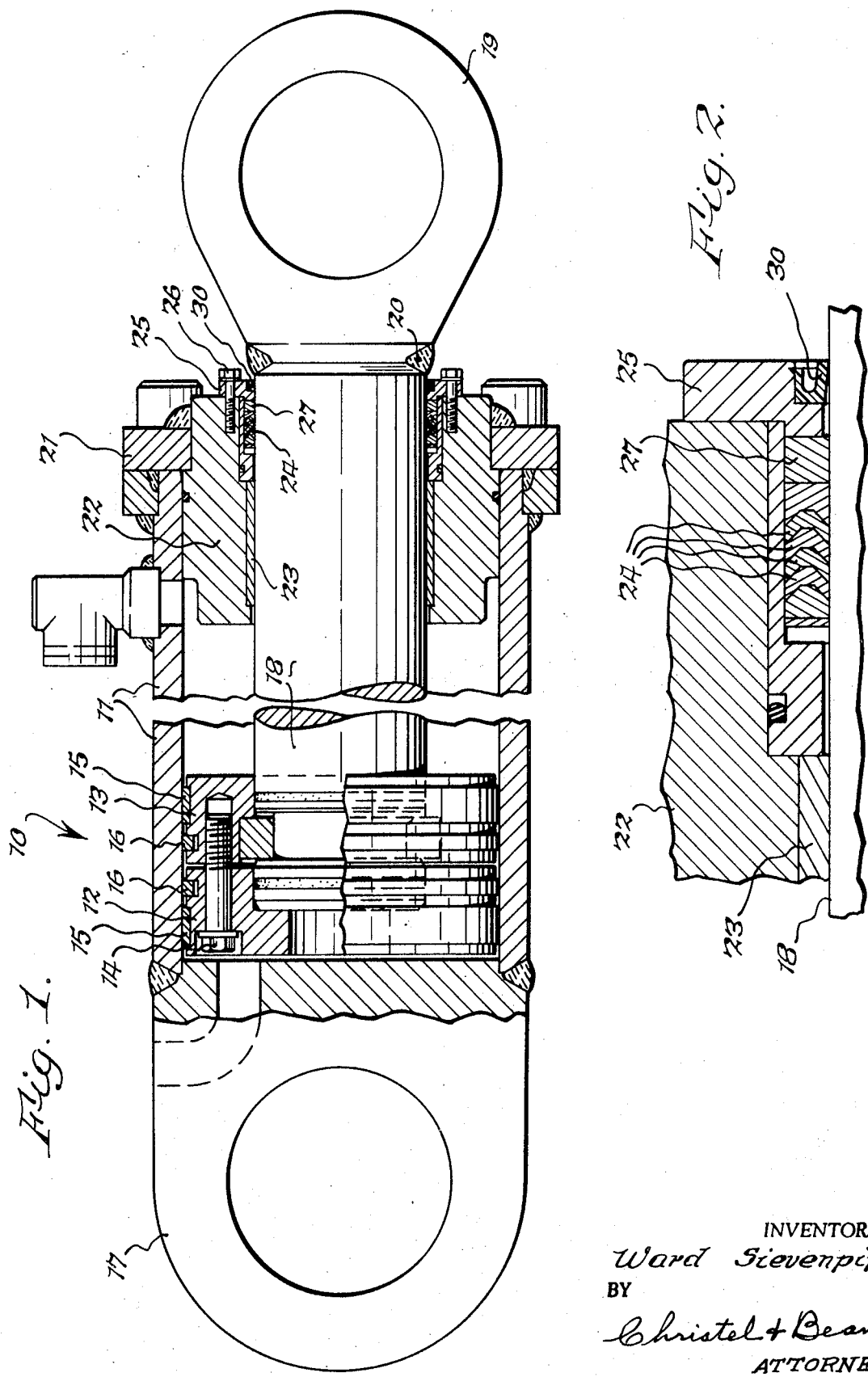

Patented April 11, 1972
3,655,204
2 Sheets-Sheet 2
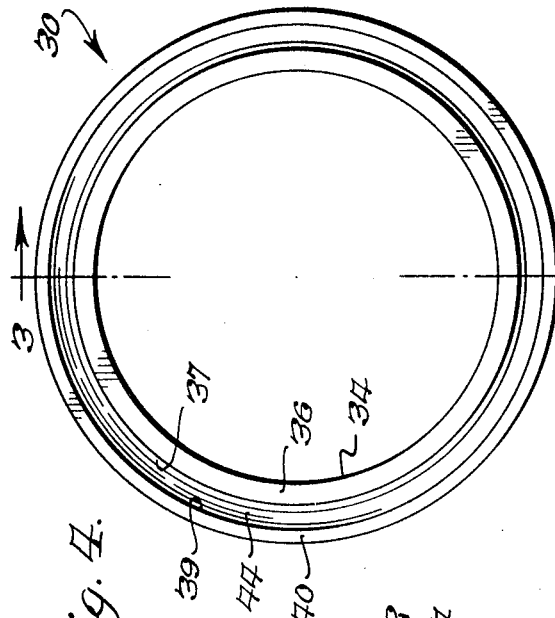
Fig. 4.
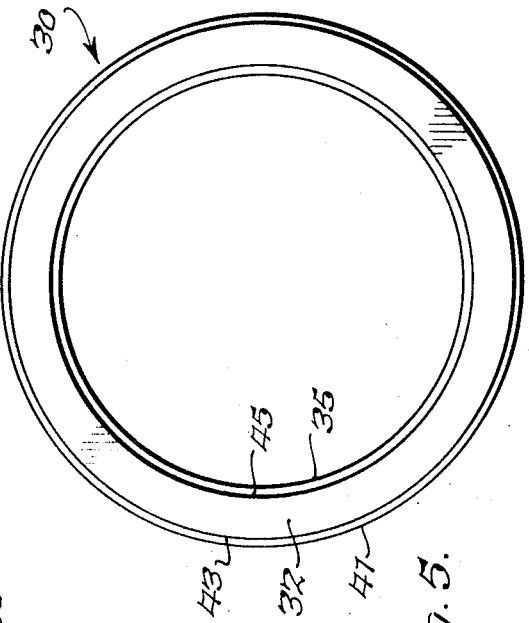
Fig. 5.
Fig. 6.
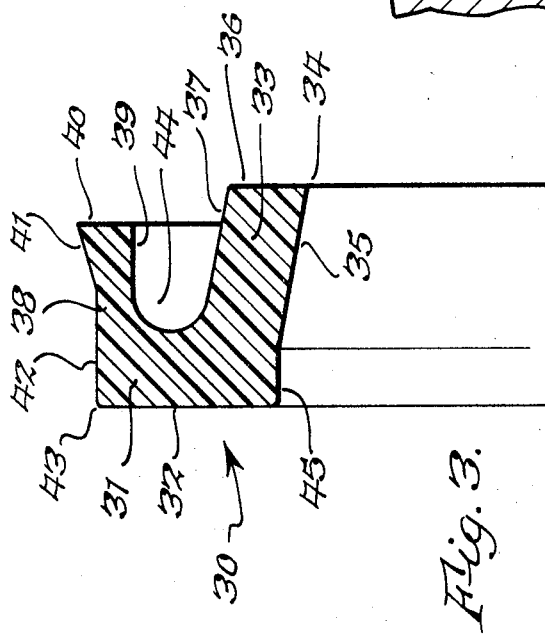
Fig. 3.
INVENTOR.
Ward Sievenpiper
BY
Christel & Bean
ATTORNEYS.

ROD WIPER

BACKGROUND OF THE INVENTION

This invention relates to a wiper for cleaning one of two relatively reciprocable members and, more particularly, to a new and improved rod wiper for hydraulic cylinders.

When an hydraulic cylinder is operated in a manner such that the piston is extended against the load, the rod connecting the piston to the load is externally exposed over a major portion of the length thereof. Under adverse environmental conditions, the surface of the rod is easily contaminated with dirt, mud, ice and other undesirable substances. Provision must be made for preventing these substances from being carried into the interior of the hydraulic cylinder as the piston is retracted.

Conventionally, an annular flexible wiper member is provided which surrounds the rod in wiping contact therewith and which wiper member is bonded in a metal casing secured in the housing of the hydraulic cylinder. This arrangement undesirably is relatively costly to manufacture in that it requires the tooling of two metal parts, casing and housing, and in that it necessitates bonding of the wiper member into the casing.

SUMMARY OF THE INVENTION

It is, therefore, an object of this invention to provide a wiper member adapted to fit within a cavity in the housing of an hydraulic cylinder and to wipe against the piston rod without the need for a separate metal casing such as customarily provided.

It is a further object of this invention to provide such a wiper member having an effective wiping and scraping action with a minimum of frictional heat build up.

It is a further object of this invention to provide such a wiper which is readily interchangeable with the combined casing and wiper arrangement heretofore employed.

The present invention provides an hydraulic cylinder rod wiper formed from a material having sufficient hardness so as to be retained in a cavity of the cylinder housing and which material further has sufficient resistance to permanent set so as to scrape and wipe in an effective manner. A wiping or scraping portion thereof has line contact with the surface being wiped thereby minimizing heat build up due to friction. A second portion is formed with a shoulder adapted to engage a surface of the cavity. The wiping or scraping portion is flexible to a limited extent toward and away from the other portion so as to enhance the flow of removed impurities.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 1 is a side elevational view, partially in section, of an hydraulic cylinder equipped with the wiper provided by this invention, the intermediate portion of the cylinder being broken away for ease in illustration;

FIG. 2 is an enlarged sectional view of a portion thereof;

FIG. 3 is an enlarged sectional view of the wiper of the present invention taken about on line 3—3 in FIG. 4;

FIG. 4 is an elevational view of one axial end face of the wiper of the present invention;

FIG. 5 is an elevational view of the opposite axial end face thereof; and

FIG. 6 is a fragmentary vertical sectional view of an hydraulic cylinder having formed in the housing thereof a cavity adapted to receive the wiper of the present invention.

DETAILED DESCRIPTION OF THE ILLUSTRATED EMBODIMENT

FIG. 1 shows an hydraulic cylinder 10 which includes, briefly, a cylindrical housing 11, a piston assembly consisting of two parts 12 and 13 joined together by suitable fasteners 14 and which is reciprocable within housing 11. A small gap or clearance exists between the outer surface of the piston and the inner surface of housing 11, and a pair of sleeve bearings 15 and piston rings 16 are positioned in corresponding annular grooves in the piston and in contact with the inner surface of housing 11. Housing 11 terminates at one end in an eye 17 for mounting or otherwise securing hydraulic cylinder 10 to a suitable support. A rod 18 is connected at one end in the assembly of piston parts 12, 13 and extends out from the interior of housing 11 whereupon it terminates in an eye member 19 to facilitate connection to a mechanical load. The main body cylindrical portion of rod 18 meets eye member 19 in an annular weld designated 20 in FIG. 1. At the end of housing 11 through which rod 18 projects or extends there is fixed or otherwise secured a box assembly including an outer member 21 and an inner member 22. A small gap or clearance exists between the inner member 22 and the outer surface of rod 18, and a sleeve bearing 23 and packing members 24 are received in corresponding annular grooves or other suitable arrangements in member 22 and in operative contact with rod 18. An annular retainer plate 25 is secured to the outer axial end face of member 22, concentric with respect to rod 18, securement being provided by suitable means such as the screw designated 26 in FIG. 1. A small gap or clearance exists between retainer plate 25 and rod 18, as shown in FIG. 2, and a bearing 27 is positioned between plate 25 and packing member 24, all in a manner known and understood by those skilled in the art. Retainer plate 25 is provided with an annular cavity surrounding rod 18 which cavity is adapted to receive the wiper member 30 of the present invention. The structure of wiper member 30 as well as of the cavity in the cylinder housing in which it is received will be described in detail hereafter. Hydraulic cylinder 10 in FIG. 1, moreover, is merely illustrative of other types of cylinders in which wiper member 30 can be employed, for example cylinders having a single rather than two part piston member and cylinders of the telescoping variety.

FIGS. 3-5 show in detail the wiper member 30 of the present invention. Wiper 30, as indicated in FIGS. 1 and 2, is adapted to fit within the cavity of a first member (in this instance an hydraulic cylinder housing) and wipe against a second, relatively reciprocable member (in this instance, rod 18). Referring now to FIG. 3 wiper 30 comprises an annular body 31 of synthetic plastic material having, in preferred form, a generally planar axial end face 32. Body 31 is formed at its opposite axial end into a first annular flange 33 of generally frusto-conical outline extending generally axially from the inner half of body 31. The inner surface 35 of flange 33 is inclined relative to the wiper axis, being disposed so as to extend slightly radially inwardly from body 31 toward a sharp wiping edge 34 formed by the juncture of surface 35 and a generally planar end face 36. End face 36 is disposed in a plane substantially parallel to end face 32 and also meets the outer surface 37 to flange 33. Outer surface 37, in turn, is disposed generally parallel with respect to inner surface 35 of flange 33.

Wiper body 31 is formed at this same axial end into a second annular flange 38 extending generally axially from the outer half of body 31 and having a portion adapted to fit into the retainer plate cavity. Flange 38 has an inner surface 39 and a generally planar axial end face 40 which is disposed in a plane substantially parallel to end face 32. Flange 38 is provided with an inclined outer surface 41 which extends radially outwardly from body 31 and meets end face 40 to form a shoulder which is adapted to engage a shouldered surface of the cavity in a manner to be described in detail presently. Surface 41 meets outer surface 42 of body 31 which, in turn, meets axial end face 32 in a right angle edge 43. As shown in FIG. 3 flanges 33 and 38 are spaced apart radially thereby defining an annular groove 44. Groove 44 is generally smooth or rounded at the axial end thereof nearest end face 32, and the spacing between flanges 33, 38 increases gradually in an axial direction away from end face 32 because of the axially inward inclination of flange 33. The inner surface 35 of flange 33 meets a heel 45 which, in turn, meets axial end face 32 in a right angle edge, surfaces 42 and 45 thus being parallel. As shown in FIG. 3, flange 33 extends axially beyond flange 38.

Wiper 30 being of synthetic plastic material preferably is molded to the shape shown in FIGS. 3–5 and to the desired size. The synthetic plastic material from which wiper 30 is molded must have sufficient hardness so that wiper 30 is self-retained in the cavity by engagement of shoulder 40, 41 with wall 55 and sufficient memory or resistance to permanent set so as to maintain edge 34 in tension against rod 18 and thereby continuously scrape and wipe effectively. A preferred material is urethane having a minimum durometer rating of about 70. In particular, a durometer rating of about 90 has been found especially desirable. The urethane material can be plain or it can be filled with glass fibers in an amount by weight of about 15 percent so as to enhance the strength of the material.

FIG. 6 is a fragmentary, enlarged vertical sectional view of a portion of hydraulic cylinder 10 including member 25 and rod 18 and showing in detail a cavity 50 in the inner surface of the cylinder housing at one axial end thereof into which wiper 30 of the present invention is fitted. Cavity 50 is annular, concentric with the axis of rod 18, and includes an inner, axial end surface 51 disposed in a plane perpendicular with respect to the axis of rod 18. Cavity 50 further includes an annular wall 52 which meets end wall 51 in a right angle and which extends for about one half the axial length of cavity 50. Annular wall 52 meets an oblique annular wall 53 which extends outwardly away from wall 51 and terminates at a point spaced within cavity 50, thereby defining an annular retainer lip 54 having an inner wall 55 which meets wall 53 and provides a shoulder disposed in a plane perpendicular to the axis of rod 18. Lip 14 is defined by shoulder wall 55 and an axially extending inner wall 56 coincident with wall 52 and which meets the outer axial end surface 58 of member 25 in a relatively smooth transition wall surface 57 oblique with respect to the axis of rod 18.

Wiper 30 is fitted into cavity 50 so as to be placed in operative position in hydraulic cylinder 10. In particular, wiper 30 is fitted in cavity 50 in a manner such that end face 32 of wiper 30 contacts end wall 51 of cavity 50 and surface 42 of wiper 30 is in contact with wall 52 of cavity 50. Surface 41 of wiper 30 follows wall 53 of cavity 50 and shoulder 40, 41 of wiper 30 abuts wall 55 of lip 54 to retain wiper 30 in cavity 50. It will be appreciated that the axial distance from wall 51 to wall 55 of lip 54 equals the distance between end surface 32 and flange end wall 40 of wiper 30 so as to provide a snug fit. With wiper 30 assembled in this position in cavity 50, wiping edge 34 contacts the outer surface of rod 18, and the inner diameter of wiper 30 along edge 34 is slightly less than the outer diameter of rod 18, placing edge 34 in tension so as to provide an effective scraping and wiping action. Thus, as rod 18 reciprocates relative to housing 25, wiper 30 functions to scrape and otherwise remove unwanted material from the surface of rod 18.

The material from which wiper 30 is molded is selected so as to have sufficient memory or resistance to permanent set whereby wiping edge 34 is maintained in tension with respect to the outer surface of rod 18. In addition, the slight difference between the outer diameter of rod 18 and the inner diameter of wiping edge 34 together with the flexible or resilient nature of the synthetic material causes flange 33 to flex or spring slightly radially outwardly when wiper 30 is on rod 18. This cantilever type action of flange 33 renders more effective the removal of material from rod 18. This is because upon flexing of flange 33 the disposition of end face 36 changes from being perpendicular to slightly inclined with respect to the axis of rod 18 in a direction away from edge 34 toward annular groove 44. This, in turn, facilitates the flow of material from cutting edge 34 toward annular groove 44 whereupon it is removed. In addition, the cantilever or spring action of flange 33 permits accommodation of a bearing clearance.

By virtue of this arrangement, there is provided only line contact between the chisel-like cutting edge 34 and the outer surface of rod 18. A clearance exists between the remainder of wiper 30 and rod 18, as seen in FIG. 2, that clearance being greatest between heel portion 45 and rod 18 and decreasing gradually in a direction toward edge 34 along surface 35. Provision of this clearance is important to minimize friction between wiper 30 and rod 18 and the heat buildup which would otherwise result. It will also be appreciated that the provision of this clearance together with the tension contact between edge 34 and the outer surface of rod 18 lengthens the wear life of wiper 30.

The axial distance between end face 32 of wiper 30 and end face 36 of flange 33 should not be greater than the axial distance between end face 58 of member 25 and end wall 51 of cavity 50 shown in FIG. 6. This is to avoid destructive wear of wiper 30 which otherwise might result from contact of cylinder parts. Keeping end face 36 of flange 33 flush with end wall 58 of member 25 whereby end face 36 is substantially coplanar with the axial end of housing 11, avoids interference with cylinder parts. In addition, this enhances the self-cleaning capability of wiper 30 because face 36 is exposed and flush instead of being inset as is the case with conventional wiper arrangements. With the urethane material of wiper 30 having a minimum durometer hardness of 70, preferably about 90, wiper 30 has sufficient hardness so that shoulder 41 and flange 38 are adequately retained in cavity 50.

The overall dimension of wiper 30 can be the same as the overall dimension of the standard metal-cased wiper arrangement heretofore available, that is, the dimension of the metal casing plus the wiper itself. As a result, wiper 30 is readily interchangeable with such prior wiper assemblies, requiring only machining of the cavity wall to provide shoulder 55.

It is therefore apparent that the present invention accomplishes its intended objects. While a single specific embodiment of the present invention has been described in detail, this has been done by way of illustration without thought of limitation.

I claim:

1. In combination:
   a. a first member having an interior region defining an inner surface, an axial end face, and an annular cavity formed in said inner surface and exposed at said axial end face;
   b. a second member reciprocable within said first member and extending beyond said axial end face;
   c. said cavity having an end wall located axially within said axial end face of said first member, an annular outer wall extending axially from said cavity end wall, and an oblique wall extending from said annular wall and terminating in said cavity to define an annular retaining lip;
   d. a wiper member fitted in said cavity, said wiper member comprising an annular body of synthetic plastic material extending along a major portion of said cavity end wall, a first annular flange having a portion in wiping contact with said second member, and a second annular flange having an oblique outer surface portion corresponding with said cavity oblique wall and having an end face meeting said oblique outer surface to define a shoulder abutting said cavity retaining lip;
   e. said first and second flanges defining therebetween an annular groove and said first flange having radial and axial dimensions greater than that of said second flange; and
   f. said synthetic plastic material having sufficient hardness whereby said wiper is self-retained in said cavity by engagement of said shoulder with said cavity retaining lip and sufficient memory whereby said wiping portion is maintained in tension against said second member.

2. The combination according to claim 1 wherein said wiper body is of urethane having a minimum durometer rating of about 70.

3. The combination according to claim 1 wherein said first annular flange has an inner surface inclined from said wiping portion outwardly toward said body whereby a clearance is provided between the remainder of the inner surface of said wiper and the outer surface of said second member.

4. The combination according to claim 1 wherein said first flange terminates in an end face substantially flush with said axial end face of said first member.

5. The combination according to claim 1 wherein said first flange is of generally frusto-conical outline and terminates in a sharp wiping edge at the inner surface thereof having a diameter slightly less than the outer diameter of said second member.

6. The combination according to claim 1 wherein said first and second members comprise the housing and reciprocable rod, respectively, of an hydraulic cylinder.

7. In combination:
   a. a first member having an interior region defining an inner surface, an axial end face, and an annular cavity formed in said inner surface and exposed at said axial end face;
   b. a second member reciprocable within said first member and extending beyond said axial end face;
   c. said cavity having an end wall located axially within said axial end face of said first member, an annular outer wall extending axially from said cavity end wall, and an oblique wall extending from said annular wall and terminating in said cavity to define an annular retaining lip;
   d. a wiper member fitted in said cavity, said wiper member comprising an annular body of synthetic plastic material extending along a major portion of said cavity end wall, a first annular flange having a portion in wiping contact with said second member, and a second annular flange having an oblique outer surface portion corresponding with said cavity oblique wall and having an end face meeting said oblique outer surface to define a shoulder abutting said cavity retaining lip;
   e. said first and second flanges defining therebetween an annular groove and said first flange terminating in an end face substantially flush with said axial end face of said first member; and
   f. said synthetic plastic material having sufficient hardness whereby said wiper is self-retained in said cavity by engagement of said shoulder with said cavity retaining lip and sufficient memory whereby said wiping portion is maintained in tension against said second member.

8. The combination according to claim 7 wherein said first flange of said wiper terminates in a sharp wiping edge at the inner surface thereof having a diameter slightly less than the outer diameter of said rod.

9. The combination according to claim 8 wherein the inner surface of said first annular flange is inclined from said wiping edge outwardly toward the heel of said body, thereby providing clearance between the remainder of the wiper inner surface and the outer surface of said rod.

10. The combination according to claim 7 wherein said first and second flanges are spaced apart radially thereby defining said annular groove, the spacing between said flanges increasing gradually in an axial direction from said body.

11. The combination according to claim 7 wherein said wiper body is of urethane having a minimum durometer rating of about 70.

12. The combination according to claim 7 wherein said first and second members comprise the housing and reciprocable rod, respectively, of an hydraulic cylinder.

* * * * *